(12) United States Patent
Moon

(10) Patent No.: US 8,575,233 B2
(45) Date of Patent: Nov. 5, 2013

(54) SLIP-RESISTANT RUBBER COMPOSITION, OUTSOLE USING THE RUBBER COMPOSITION AND METHOD OF MANUFACTURING THE OUTSOLE

(76) Inventor: Ku Do Moon, Seoul (KR)

( * ) Notice: Subject to any disclaimer, the term of this patent is extended or adjusted under 35 U.S.C. 154(b) by 820 days.

(21) Appl. No.: 12/767,004

(22) Filed: Apr. 26, 2010

(65) Prior Publication Data

US 2011/0258886 A1     Oct. 27, 2011

(51) Int. Cl.
*C08K 3/40* (2006.01)
*A43B 13/04* (2006.01)

(52) U.S. Cl.
USPC .......................... 523/150; 36/32 R; 12/146 B

(58) Field of Classification Search
USPC ....................................................... 523/150
See application file for complete search history.

(56) References Cited

U.S. PATENT DOCUMENTS

| 5,755,045 A | 5/1998 | Mashita et al. | |
| 6,635,727 B1 * | 10/2003 | Koda et al. | 526/160 |
| 2006/0057321 A1 * | 3/2006 | Mori et al. | 428/36.92 |

FOREIGN PATENT DOCUMENTS

| JP | 11-164707 | 6/1999 |
| JP | 2002-241507 | 8/2002 |
| JP | 2004-049682 | 2/2004 |
| JP | 2007-282648 | 11/2007 |
| KR | 10-2006-0080121 | 7/2006 |

* cited by examiner

*Primary Examiner* — Robert D. Harlan
(74) *Attorney, Agent, or Firm* — Workman Nydegger

(57) ABSTRACT

Disclosed is a slip-resistant rubber composition, which includes a substrate made of rubber, about 0.5 to about 3 parts by weight of a vulcanizer, about 2 to about 5 parts by weight of glass fibers, and about 1 to about 100 parts by weight of an additive, based on 100 parts by weight of the substrate, and has remarkably improved non-slip properties. Also, an outsole using the slip-resistant rubber composition and a method of manufacturing the outsole are provided, in which the outsole which results from subjecting the slip-resistant rubber composition to cutting, arrangement and vulcanization molding and in which one-side ends of the glass fibers are located at the lower surface of the outsole may exhibit remarkably improved non-slip properties so that a user who is wearing shoes having such an outsole is able to walk even on inclined ice.

6 Claims, 5 Drawing Sheets

SLIP-RESISTANT RUBBER COMPOSITION, OUTSOLE USING THE RUBBER COMPOSITION AND METHOD OF MANUFACTURING THE OUTSOLE

CROSS-REFERENCE TO RELATED APPLICATIONS

Not applicable.

BACKGROUND OF THE INVENTION

1. The Field of the Invention

The present invention relates to a slip-resistant rubber composition, an outsole using the rubber composition, and a method of manufacturing the outsole.

2. The Relevant Technology

Typically, the sole structure of shoes includes an insole, a midsole and an outsole. The outsole is the portion of the shoe that comes into contact with the land surface and to which the land surface primarily applies its influence. Hence, the outsole should be able to be appropriately adapted for the state of the land surface which varies during movement. In particular, in the case where a pedestrian slips upon walking, large damage to the body of the pedestrian may occur, and thus the slip-resistant function of the outsole is regarded as important.

Accordingly, conventional outsoles are produced by mixing rubber with a reinforcing agent and a filler such as silica or carbon black to improve mechanical properties such as wear resistance thus furnishing a slip-resistant function. However, the improvement of mechanical properties requires the use of silica or carbon black in large amounts, undesirably causing problems in terms of residual stress, high viscosity and dynamic heating. Furthermore, such an outsole cannot perform the slip-resistant function on the land surface which is wet due to rain or snow. In particular, in the winter season, in the case where the ice layer is formed on the land surface, the conventional outsole is problematic because the slip-resistant function is not present at all.

Therefore, there is an increasing need for a slip-resistant rubber composition and an outsole using the same, by which a user is able not to slip but to walk even on land surfaces covered with ice.

SUMMARY OF THE INVENTION

Accordingly, in one embodiment the present invention has been made keeping in mind the above problems encountered in the related art. Thus, in one embodiment the present invention is intended to provide a slip-resistant rubber composition, which includes glass fibers and various types of additives for uniformly dispersing the glass fibers, thus remarkably improving wear resistance and non-slip properties without changing the basic properties of rubber.

Also, one embodiment of the present invention is intended to provide an outsole which uses the slip-resistant rubber composition having remarkably improved wear resistance and non-slip properties, so that one-side ends of glass fibers are located at the lower surface of the outsole to enable a user who is wearing shoes having such an outsole to walk even on inclined ice.

Also, one embodiment of the present invention is intended to provide a method of manufacturing the outsole using the slip-resistant rubber composition, which includes cutting and arrangement so that many one-side ends of glass fibers are located at the lower surface of the outsole, and thus the outsole may exhibit remarkably improved wear resistance and non-slip properties.

One embodiment of the present invention provides a slip-resistant rubber composition, including a substrate made of rubber, about 0.2 to about 7 parts by weight of a vulcanizer, about 1 to about 10 parts by weight of glass fibers, and about 1 to about 200 parts by weight of an additive, based on 100 parts by weight of the substrate.

Another embodiment of the present invention provides a slip-resistant rubber composition, including a substrate made of rubber, about 0.5 to about 3 parts by weight of a vulcanizer, about 2 to about 5 parts by weight of glass fibers, and about 1 to about 100 parts by weight of an additive, based on 100 parts by weight of the substrate.

In this embodiment, the rubber may include one or a mixture of two or more selected from the group consisting of natural rubber, styrene butadiene rubber, chloroprene rubber, nitrile butadiene rubber, butyl rubber, butadiene rubber, isoprene rubber, and ethylene propylene rubber.

In this embodiment, the additive may include one or a mixture of two or more selected from the group consisting of a filler, a softener, a vulcanization accelerator, an antioxidant, and a wear inhibitor.

In this embodiment, the vulcanizer may include one or a mixture of two or more selected from the group consisting of sulfur, selenium, tellurium and an organic sulfur compound, the filler may include one or a mixture of two or more selected from the group consisting of carbon black, white carbon, calcium carbonate, magnesium carbonate and talc, and the softener may include one or a mixture of two or more selected from the group consisting of process oil, pine oil, glycerin, stearic acid, and dioctylphthalate.

In this embodiment, the vulcanization accelerator may include one or a mixture of two or more selected from the group consisting of zinc oxide, magnesium oxide, polyethyleneglycol, mercaptobenzothiazole, tetramethylthiuram mono sulfide and dibenzothiazole disulfide, the antioxidant may include one or a mixture of two or more selected from the group consisting of hydroquinone, dibutylhydroxytoluene and butylhydroxyanisole, and the wear inhibitor may include one or a mixture of two or more selected from the group consisting of β-(3,4-epoxycyclohexyl)ethyltrimethoxysilane, γ-glycidoxypropyltrimethoxysilane and γ-mercaptopropyltrimethoxysilane.

In one embodiment, the additive may include about 15 to about 25 parts by weight of a filler, about 4 to about 6 parts by weight of a softener, about 6 to about 10 parts by weight of a vulcanization accelerator, about 1 to about 2 parts by weight of an antioxidant, and about 0.5 to about 1 parts by weight of a wear inhibitor, based on 100 parts by weight of the substrate.

In one embodiment, the rubber may include about 10 to about 20 wt % of natural rubber, about 40 to about 60 wt % of isoprene rubber, and about 25 to about 35 wt % of butadiene rubber, the filler may include carbon black, the softener may include about 70 to about 90 wt % of process oil and about 10 to about 30 wt % of stearic acid, the vulcanization accelerator may include about 40 to about 60 wt % of zinc oxide, about 20 to about 30 wt % of polyethyleneglycol, about 4 to about 6 wt % of mercaptobenzothiazole, about 9 to about 14 wt % of tetramethylthiuram monosulfide, and about 0.45 to about 0.7 wt % of dibenzothiazole disulfide, the antioxidant may include dibutylhydroxytoluene, and the wear inhibitor may include β-(3,4-epoxycyclohexyl)ethyltrimethoxysilane.

A further embodiment of the present invention provides an outsole using the slip-resistant rubber composition, which results from vulcanization molding of the slip-resistant rubber composition including a substrate made of rubber and glass fibers and in which one-side ends of the glass fibers are located at the lower surface of the outsole.

In this embodiment, the glass fibers may be disposed perpendicular to the lower surface of the outsole and faces of the one-side ends of the glass fibers may be positioned to be flush with the lower surface of the outsole.

In this embodiment, the rubber composition may further include a vulcanizer and an additive, the vulcanizer being used in an amount of about 0.5 to about 3 parts by weight, the glass fibers being used in an amount of about 2 to about 5 parts by weight and the additive being used in an amount of about 1 to about 100 parts by weight based on 100 parts by weight of the substrate.

In this aspect, the additive may include one or a mixture of two or more selected from the group consisting of a filler, a softener, a vulcanization accelerator, an antioxidant and a wear inhibitor.

As such, the vulcanizer may include one or a mixture of two or more selected from the group consisting of sulfur, selenium, tellurium and an organic sulfur compound, the filler may include one or a mixture of two or more selected from the group consisting of carbon black, white carbon, calcium carbonate, magnesium carbonate and talc, and the softener may include one or a mixture of two or more selected from the group consisting of process oil, pine oil, glycerin, stearic acid and dioctylphthalate.

Furthermore, the vulcanization accelerator may include one or a mixture of two or more selected from the group consisting of zinc oxide, magnesium oxide, polyethyleneglycol, mercaptobenzothiazole, tetramethylthiuram mono sulfide and dibenzothiazole disulfide, the antioxidant may include one or a mixture of two or more selected from the group consisting of hydroquinone, dibutylhydroxytoluene and butylhydroxyanisole, and the wear inhibitor may include one or a mixture of two or more selected from the group consisting of β-(3,4-epoxycyclohexyl)ethyltrimethoxysilane, γ-glycidoxypropyltrimethoxysilane and γ-mercaptopropyltrimethoxysilane.

Still a further embodiment of the present invention provides a method of manufacturing the outsole using the slip-resistant rubber composition, including kneading a substrate made of rubber and glass fibers, thus forming a rubber composition; cutting the rubber composition at a predetermined interval thus obtaining a plurality of cut rubber composition pieces in which faces of one-side ends of the glass fibers are positioned to be flush with cut surfaces of the rubber composition pieces; arranging the plurality of cut rubber composition pieces to be parallel to each other so that the cut surfaces of the rubber composition pieces are positioned downwards; and vulcanizing the arranged rubber composition pieces using compression molding, thus manufacturing the outsole.

Yet a further embodiment of the present invention provides a method of manufacturing the outsole using the slip-resistant rubber composition, including kneading a substrate made of rubber, about 0.5 to about 3 parts by weight of a vulcanizer, about 2 to about 5 parts by weight of glass fibers and about 1 to about 100 parts by weight of an additive, based on 100 parts by weight of the substrate, thus forming a rubber composition; cutting the rubber composition at a predetermined interval thus obtaining a plurality of cut rubber composition pieces in which faces of one-side ends of the glass fibers are positioned to be flush with cut surfaces of the rubber composition pieces; arranging the plurality of cut rubber composition pieces to be parallel to each other so that the cut surfaces of the rubber composition pieces are positioned downwards; and placing the arranged rubber composition pieces in an injector and vulcanizing them using compression molding, thus manufacturing the outsole.

In this embodiment, vulcanizing may be performed at about 160 to about 200° C. under pressure of about 200 to about 300 kg/cm$^3$ using a vulcanization press.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, a detailed description will be given of a slip-resistant rubber composition, an outsole using the rubber composition, and a method of manufacturing the outsole according to different embodiments of the present invention, with reference to the appended drawings. Unless otherwise defined, all terms used herein should be interpreted as having the same meaning as commonly understood by one of ordinary skill in the art to which this invention belongs. If the meaning of any of the terms used herein is different from the meaning as commonly understood by one of ordinary skill in the art, the term should be interpreted as having the definition used herein.

Figure 1:
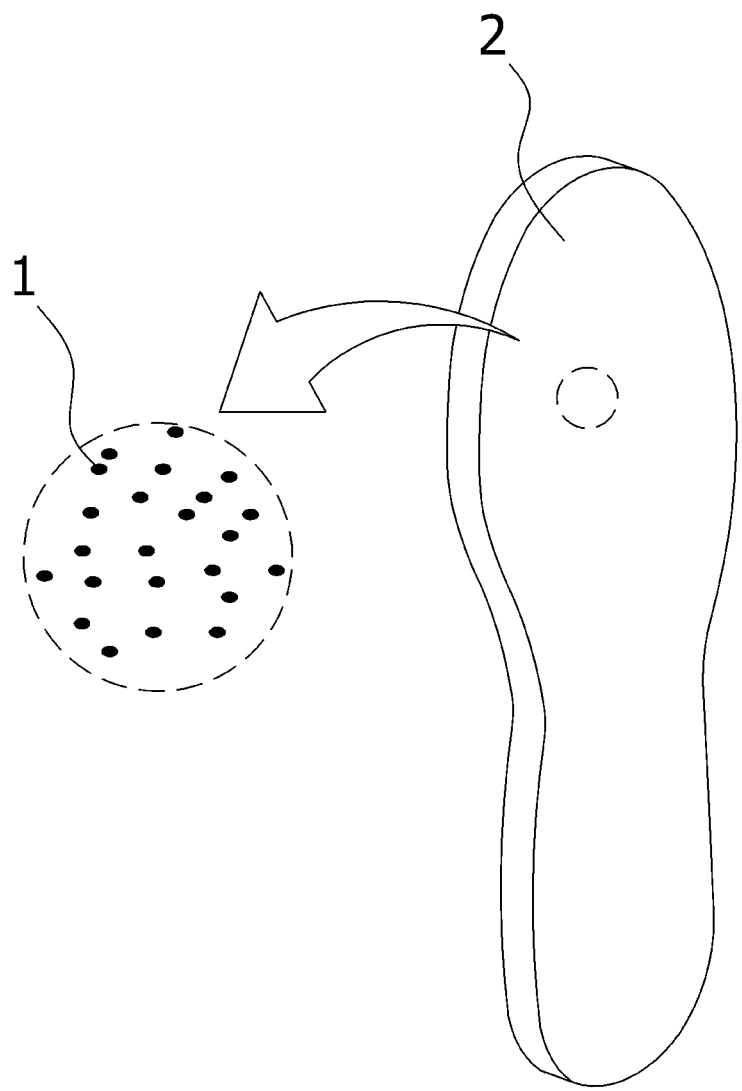
FIG. 1 is a perspective view showing an outsole using a slip-resistant rubber composition according to an embodiment of the present invention.
Figure 2:
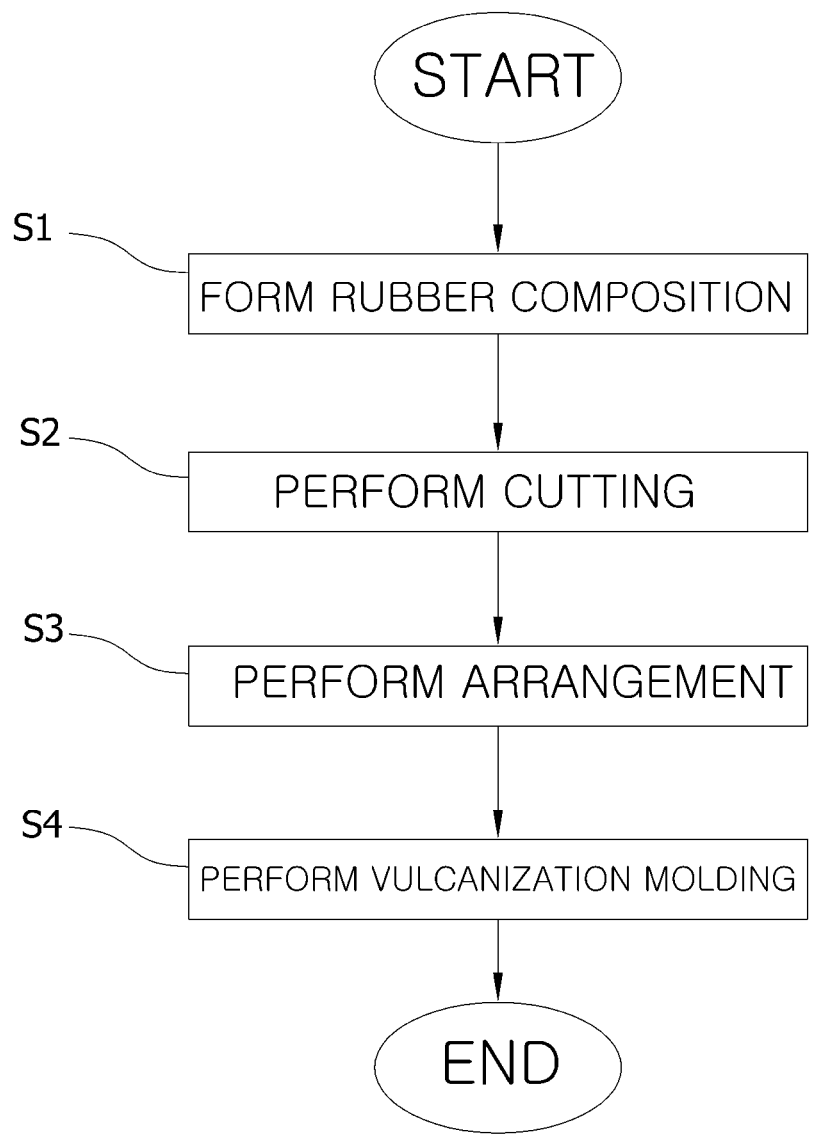
FIG. 2 is a flowchart showing a process of manufacturing the outsole using the slip-resistant rubber composition according to a further embodiment of the present invention.
Figure 3:
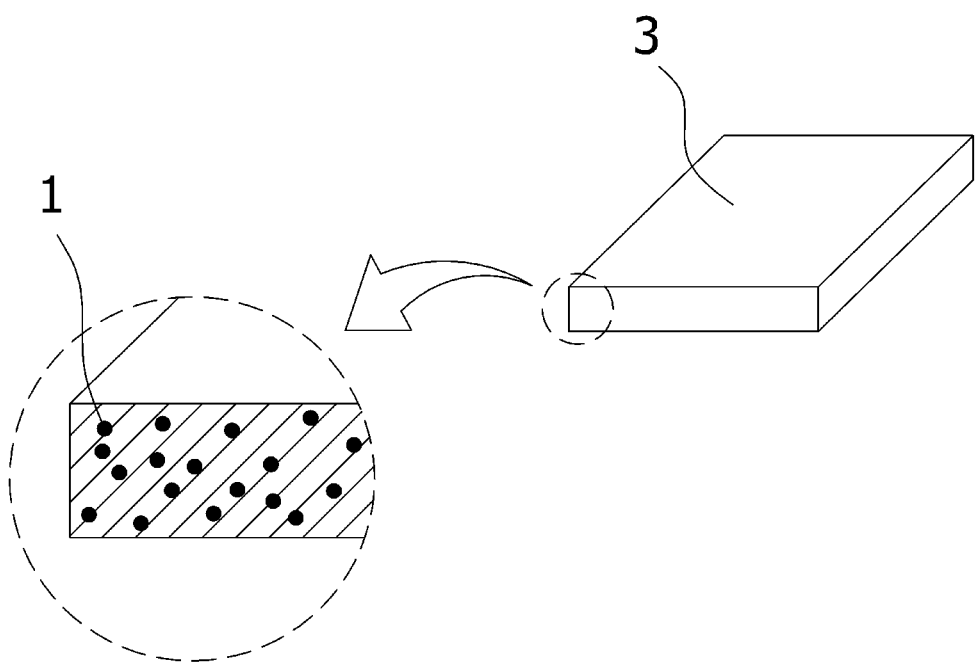
FIG. 3 is a perspective view showing the rubber composition formed in one embodiment of the present invention.
Figure 4:
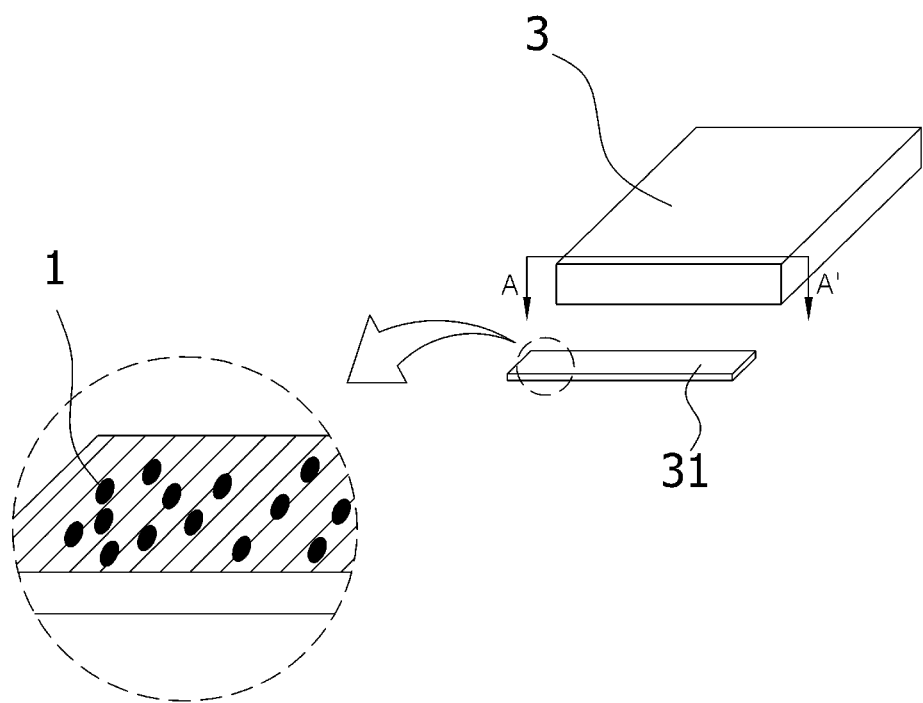
FIG. 4 is a view showing a cutting process according to one embodiment of the present invention.
Figure 5:
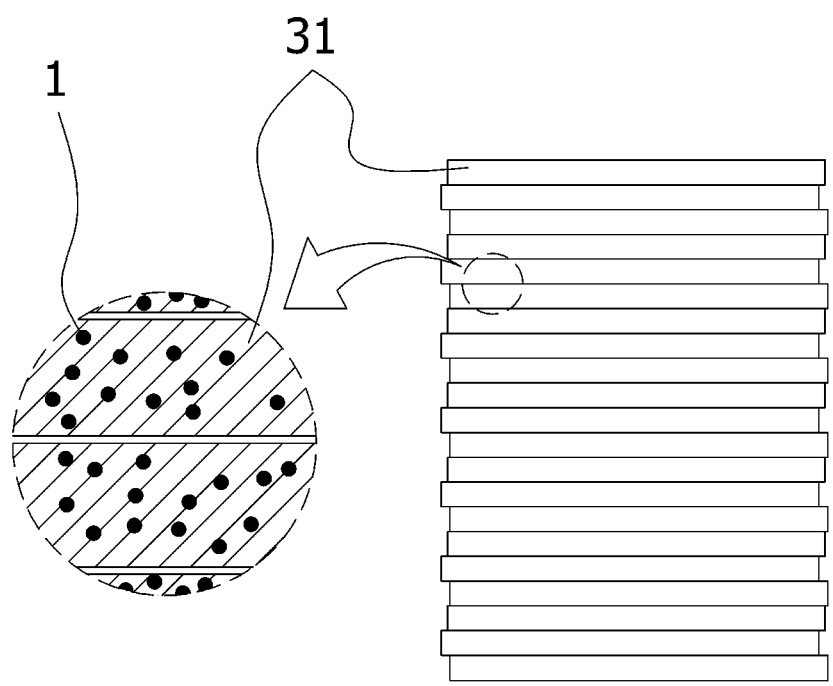
FIG. 5 is a view showing an arrangement process according to one embodiment of the present invention.

FIG. 1 is a perspective view showing an outsole using a slip-resistant rubber composition according to an embodiment of the present invention, FIG. 2 is a flowchart showing a process of manufacturing the outsole using the slip-resistant rubber composition according to a further embodiment of the present invention, FIG. 3 is a perspective view showing the rubber composition formed in one embodiment of the present invention, FIG. 4 is a view showing a cutting process according to the present invention, and FIG. 5 is a view showing an arrangement process according to one embodiment of the present invention.

The slip-resistant rubber composition according to an embodiment of the present invention includes a substrate made of rubber, about 0.2 to about 7 parts by weight of a vulcanizer, about 1 to about 10 parts by weight of glass fibers, and about 1 to about 200 parts by weight of an additive, based on 100 parts by weight of the substrate. Preferably, the slip-resistant rubber composition includes a substrate made of rubber, about 0.5 to about 3 parts by weight of a vulcanizer, about 2 to about 5 parts by weight of glass fibers, and about 1 to about 100 parts by weight of an additive, based on 100 parts by weight of the substrate.

The rubber may include one or a mixture of two or more selected from among natural rubber (NR), styrene butadiene rubber (SBR), chloroprene rubber (CR), nitrile butadiene rubber (NBR), butyl rubber (isoprene-isobutylene rubber:

IIR), butadiene rubber (BR), isoprene rubber (IR), ethylene propylene rubber (EPR), polysulfide rubber, silicone rubber, fluororubber, urethane rubber and acrylic rubber.

The vulcanizer is added to vulcanize the rubber, and may be used in an amount of about 0.5 to about 3 parts by weight based on 100 parts by weight of the substrate. If the amount of vulcanizer is less than 0.5 parts by weight, vulcanization efficiency may be decreased. In contrast, if the amount thereof is greater than 3 parts by weight, durability may be lowered attributable to excessive vulcanization. The vulcanizer may include one or a mixture of two or more selected from among sulfur, selenium, tellurium, organic sulfur compounds and metal oxides.

The glass fibers are added to improve non-slip properties, and may be used in an amount of about 2 to about 5 parts by weight based on 100 parts by weight of the substrate. If the amount of glass fibers is less than 2 parts by weight, non-slip properties may be deteriorated. In contrast, if the amount thereof exceeds 5 parts by weight, the basic properties of rubber may be deteriorated attributable to the excessive use of glass fibers. Also, the non-slip properties may vary depending on the arrangement position of glass fibers, which will be specified later when describing the outsole using the slip-resistant rubber composition and the method of manufacturing the outsole.

The additive is added to easily prepare the rubber composition and to impart predetermined properties to the rubber composition, and may be used in an amount of about 1 to about 100 parts by weight based on 100 parts by weight of the substrate. The additive may include one or a mixture of two or more selected from among a filler, a softener, a vulcanization accelerator, an antioxidant and a wear inhibitor.

The filler is added to reinforce the strength of rubber and to achieve light weightness, and may be used in an amount of about 15 to about 25 parts by weight based on 100 parts by weight of the substrate. If the amount of filler is less than 15 parts by weight, it is impossible to obtain rubber of the desired strength and light weightness. In contrast, if the amount thereof exceeds 25 parts by weight, the resulting rubber composition does not have sufficient elasticity. The filler may include one or a mixture of two or more selected from among carbon black, white carbon, calcium carbonate, magnesium carbonate, talc and clay.

The softener is added to make the rubber soft to impart plasticity thus facilitating processing, and may be used in an amount of about 4 to about 6 parts by weight based on 100 parts by weight of the substrate. If the amount of softener is less than 4 parts by weight, plasticity becomes insufficient, undesirably lowering processability. In contrast, if the amount thereof exceeds 6 parts by weight, hardness of the rubber composition becomes too low. The softener may include one or a mixture of two or more selected from among process oil, pine oil, vegetable oil, glycerin, stearic acid, cumarone-indene resin, factice and dioctylphthalate.

The vulcanization accelerator is added to accelerate the vulcanization reaction of rubber along with the vulcanizer upon vulcanization, and may be used in an amount of about 6 to about 10 parts by weight based on 100 parts by weight of the substrate. If the amount of vulcanization accelerator is less than 6 parts by weight, the vulcanization time is lengthened and high vulcanization temperature should be maintained, undesirably lowering productivity. In contrast, if the amount thereof exceeds 10 parts by weight, the durability of the resulting rubber composition may be lowered. The vulcanization accelerator may include one or a mixture of two or more selected from among zinc oxide, magnesium oxide, polyethyleneglycol (PEG), mercaptobenzothiazole (MBT), tetramethylthiuram monosulfide (TMTM) and benzothiazole disulfide (MBTS).

The antioxidant is added to prevent the oxidation of the rubber composition due to the action of oxygen, and may be used in an amount of about 1 to about 2 parts by weight based on 100 parts by weight of the substrate. If the amount of antioxidant is less than 1 part by weight, antioxidative effects cannot be achieved. In contrast, if the amount thereof exceeds 2 parts by weight, economic benefits may be negated without a large difference in the effects. The antioxidant may include one or a mixture of two or more selected from among phenyl-β-naphthylamine aromatic amine.hydroquinone, dibutylhydroxytoluene (BHT) and butylhydroxyanisole (BHA).

The wear inhibitor is added to increase the ability to disperse and bind the mixing materials which enhances the mechanical strength so that the non-marking properties of the resulting rubber composition are increased, and may be used in an amount of about 0.5 to about 1 parts by weight based on 100 parts by weight of the substrate. If the amount of wear inhibitor is less than 0.5 parts by weight, the ability to bind the mixing materials is decreased and thus mechanical strength of the resulting rubber composition becomes weak. In contrast, if the amount thereof exceeds 1 part by weight, processability may be deteriorated. The wear inhibitor may include one or a mixture of two or more selected from among β-(3, 4-epoxycyclohexyl)ethyltrimethoxysilane, γ-glycidoxypropyltrimethoxysilane and γ-mercaptopropyltrimethoxysilane).

The slip-resistant rubber composition according to one embodiment of the present invention includes glass fibers and various types of additives for uniformly dispersing the glass fibers, thus remarkably improving wear resistance and non-slip properties without changing the basic properties of rubber.

In addition, the slip-resistant rubber composition according to one embodiment of the present invention may further include a small amount of colorant in order to show various colors.

According to another embodiment of the present invention, an outsole is provided, which uses the slip-resistant rubber composition according to an embodiment of the present invention.

The outsole using the slip-resistant rubber composition according to one embodiment of the present invention is described below with reference to FIG. 1. The outsole 2 results from vulcanization molding of the slip-resistant rubber composition. The outsole 2 has a plurality of glass fibers 1 embedded therein, in which one-side ends of the glass fibers 1 are located at the lower surface of the outsole 2.

If a user who is wearing shoes having such an outsole 2 walks, one-side ends of the glass fibers 1 located at the lower surface of the outsole 2 presses the land surface that comes into contact therewith, so that a large frictional force is applied between the shoes and the land surface that is coming into contact with the shoes. Thereby, a user wearing such shoes cannot slip but can walk even on land surfaces which are watery or iced.

The outsole using the rubber composition according to one embodiment of the present invention is advantageous because the plurality of glass fibers is disposed perpendicular to the lower surface of the outsole and faces of the one-side ends of the glass fibers are positioned to be flush with the lower surface of the outsole. When the glass fibers are disposed perpendicular to the lower surface of the outsole and faces of the one-side ends thereof are positioned to be flush with the lower surface of the outsole, the glass fibers perpendicularly press the land surface upon it making contact with the outsole, so that greater pressure is applied to the land surface and the area of the outsole that comes into contact with the land surface is enlarged, thus applying a greater frictional force between the shoes and the land surface.

According to a further embodiment of the present invention, a method of manufacturing the outsole using the slip-resistant rubber composition is provided, and is described below with reference to FIGS. 1 to 5. The method of manufacturing the outsole includes formation of a rubber composition (S1), cutting (S2), arrangement (S3), and vulcanization molding (S4).

In the formation of the rubber composition (S1), the components of the rubber composition according to the embodiment of the present invention are mixed, kneaded using a kneader at a temperature lower than the vulcanization temperature (about 160 to about 200° C.), and then formed into a rubber composition having a predetermined shape, in particular, a shape of rectangular parallelepiped having low height. With reference to FIG. 3, the glass fibers 1 can be seen to be in parallel to the horizontal direction of the rubber composition 3 and to be uniformly dispersed at predetermined distances in the rubber composition 3. As such, when the rubber composition thus formed is directly vulcanization molded using a typical outsole manufacturing method to obtain an outsole, the glass fibers may be disposed parallel to the horizontal direction of the outsole, and thus, when a user who is wearing shoes having such an outsole walks, one-side ends of the glass fibers cannot press the land surface, so that a large frictional force does not occur between the shoes and the land surface, making it impossible to furnish remarkably improved non-slip properties to the extent that a user may walk even on ice. For this reason, the following procedures which enable one-side ends of the glass fibers to be located at the lower surface of the outsole are carried out in the present invention.

In the cutting (S2), the rubber composition obtained in S1 is cut at a predetermined interval thus obtaining cut resin composition pieces in which faces of the one-side ends of the glass fibers are positioned to be flush with the cut surfaces of the rubber composition pieces. With reference to FIG. 4, the rubber composition 3 formed into a shape of rectangular parallelepiped is cut at a predetermined interval in the direction of A-A', thus obtaining a plurality of cut rubber composition pieces 31 in which faces of the one-side ends of the glass fibers 1 are positioned to be flush with the cut surfaces of the rubber composition pieces 31.

In the arrangement (S3), the plurality of cut rubber composition pieces obtained in S2 are arranged to be parallel to each other such that the cut surfaces thereof are positioned downwards. FIG. 5 is a bottom view of the plurality of cut rubber composition pieces 31, which are so arranged. From this, it can be seen that when the rubber composition is cut into a plurality of cut rubber composition pieces which are then arranged, more one-side ends of the glass fibers are located at the lower surfaces of the arranged rubber composition pieces.

In the vulcanization molding (S4), the rubber composition pieces arranged in S3 are inserted into an injector, and vulcanized using compression molding, thus producing the outsole. The vulcanization molding (S4) is conducted using a vulcanization press at about 160 to about 200° C. under pressure of about 200 to about 300 kg/cm³, thus obtaining the outsole. With reference to FIG. 1, the one-side ends of the plurality of glass fibers 1 can be seen to be located at the lower surface of the outsole 2 resulting from vulcanization molding. As the number of cut rubber composition pieces required to manufacture a single outsole is increased as a result of reducing a thickness of the rubber composition obtained in S1, more one-side ends of glass fibers may be located at the lower surface of the outsole.

In this way, the method of manufacturing the outsole using the slip-resistant rubber composition according to the embodiment of the present invention includes cutting and arrangement, so that many one-side ends of glass fibers are located at the lower surface of the outsole, resulting in the outsole which exhibits remarkably improved non-slip properties.

A better understanding of the present invention may be obtained through the following examples which are set forth to illustrate, but are not to be construed as the limit of the present invention.

Examples 1 to 4

Rubber, a filler, a softener, an antioxidant, a wear inhibitor and glass fibers in the amounts shown in Table 1 were kneaded together for 15 min using a kneader having an internal temperature of 80° C., and then kneaded with a vulcanizer and a vulcanization accelerator in the amounts shown in Table 1 for 15 min using a roll mill having a surface temperature of 60° C., followed by forming a rubber composition having a shape of rectangular parallelepiped with a thickness of 1 cm.

The rubber composition was cut at intervals of 0.4 mm in a perpendicular direction, thus obtaining twelve cut rubber composition pieces, which were then arranged to be parallel to each other so that the cut surfaces thereof were positioned downwards. The rubber composition pieces thus arranged were inserted into a vulcanization press, and vulcanization molded at 180° C. under pressure of 250 kg/cm³ for 12 min, thereby manufacturing an outsole.

Comparative Example 1

Rubber, a filler, a softener, an antioxidant, and a wear inhibitor in the amounts shown in Table 1 were kneaded together for 15 min using a kneader having an internal temperature of 80° C., and then kneaded with a vulcanizer and a vulcanization accelerator in the amounts shown in Table 1 for 15 min using a roll mill having a surface temperature of 60° C., followed by forming a rubber composition having a shape of rectangular parallelepiped with a thickness of 1 cm.

The rubber composition was cut at intervals of 0.4 mm in a perpendicular direction, thus obtaining twelve cut rubber composition pieces, which were then arranged to be parallel to each other so that the cut surfaces thereof were positioned downwards. The rubber composition pieces thus arranged were inserted into a vulcanization press, and vulcanization molded at 180° C. under pressure of 250 kg/cm³ for 12 min, thereby manufacturing an outsole.

Comparative Example 2

Rubber, a filler, a softener, an antioxidant, a wear inhibitor and glass fibers in the amounts shown in Table 1 were kneaded together for 15 min using a kneader having an internal temperature of 80° C., and then kneaded with a vulcanizer and a vulcanization accelerator in the amounts shown in Table 1 for 15 min using a roll mill having a surface temperature of 60° C., followed by forming a rubber composition having a shape of rectangular parallelepiped with a thickness of 0.4 mm.

The rubber composition thus obtained was inserted into a vulcanization press, and vulcanization molded at 180° C. under pressure of 250 kg/cm³ for 12 min, thereby manufacturing an outsole.

TABLE 1

| | | | | | | [unit: parts by weight] | |
|---|---|---|---|---|---|---|---|
| | | Ex. 1 | Ex. 2 | Ex. 3 | Ex. 4 | C. Ex. 1 | C. Ex. 2 |
| Rubber | NR[1] | 15 | 20 | | 10 | 15 | 15 |
| | BR[2] | 35 | 30 | 50 | 50 | 35 | 35 |
| | IR[3] | 50 | 50 | 50 | 40 | 50 | 50 |
| Filler | Carbon Black[4] | 20 | 20 | 20 | | 20 | 20 |
| Softener | P-oil[5] | 4 | 5 | | | 4 | 4 |
| | Stearic acid[6] | 1 | | | 1.5 | 1 | 1 |
| Vulcanizer | Sulfur[7] | 1.5 | 1.5 | 2.0 | 1.5 | 1.5 | 1.5 |
| Vulcanization | Zinc oxide[8] | 4 | 6 | | 5 | 4 | 4 |
| Accelerator | PEG[9] | 2 | | 2 | | 2 | 2 |
| | MBT[10] | 0.5 | 0.7 | 0.5 | | 0.5 | 0.5 |
| | TMTM[11] | 0.9 | | 1.0 | 1.0 | 0.9 | 0.9 |
| | MBTS[12] | 0.05 | | | 0.07 | 0.05 | 0.05 |
| Antioxidant | BHT[13] | 1.5 | 1.5 | | 1.0 | 1.5 | 1.5 |
| Wear inhibitor | A-186[14] | 0.7 | 0.7 | 0.7 | 1.0 | 0.7 | 0.7 |
| Glass Fibers[15] | | 2.5 | 3 | 3 | 2.0 | | 2.5 |

Note)
[1] AVR 10
[2] LG Chemical 1028
[3] Kumho Petrochemical IR
[4] KCB, HAF(N330)
[5] Machang Petrochemical paraffin oil
[6] LG Chemical St/A
[7] Miwon Chemical Sulfur
[8] Yoo Seung Industry Zinc oxide
[9] Dongnam Chemical PEG
[10] OCI D
[11] OCI DM
[12] OCI TS
[13] Uniroyal Chemical BHT
[14] Silquest A-186(β-(3,4-epoxycyclohexyl)ethyltrimethoxysilane)
[15] Owens corning Chopped strand Test Example The specific gravity, hardness, tensile strength, wear resistance and non-slip properties of the outsoles of Examples 1 to 4 and Comparative Examples 1 and 2 were measured by the following methods. The results are shown in Table 2 below.
1. Specific gravity: three measurements were performed using an automated measurement system according to KS M6519 and averaged.
2. Hardness: measurement was performed according to KS M6518.
3. Tensile strength: measurement was performed according to KS M6518.
4. Wear resistance: a wear resistance ratio was determined using an NBS wear tester (KS M6625).

NBS wear resistance ratio (%)=(number that a test sample passes through the wear tester so as to wear a thickness 1 mm of the test sample/number that a standard rubber sample passes through the wear tester so as to wear a thickness 1 mm of the standard rubber sample)×100
5. Non-slip properties: measurement was performed in a dry state and a wet state using a friction tester according to ASTM D1894. The measurement of non-slip properties on ice had no standard method and thus was performed by inclining an ice lump at 30° and then judging whether a user was able not to slip but to walk on ice in a state of wearing shoes having the outsole of each of Examples 1 to 4 and Comparative Examples 1 and 2.

TABLE 2

| | Unit | Ex. 1 | Ex. 2 | Ex. 3 | Ex. 4 | C. Ex. 1 | C. Ex. 2 |
|---|---|---|---|---|---|---|---|
| Specific Gravity | | 1.02 | 1.04 | 1.03 | 1.05 | 1.03 | 1.04 |
| Hardness | Asker A | 68 | 66 | 65 | 64 | 58 | 66 |
| Tensile Strength | Kg/cm³ | 160 | 158 | 163 | 165 | 155 | 159 |
| Wear Resistance | % | 230 | 220 | 250 | 240 | 100 | 150 |
| Non-slip (dry) | μ | 2.24 | 2.10 | 2.08 | 2.09 | 1.8 | 2.0 |
| Non-slip (wet) | μ | 1.95 | 1.90 | 1.82 | 1.89 | 1.0 | 1.5 |
| Non-slip (ice) | | Possible to walk | Possible to walk | Possible to walk | Possible to walk | Impossible to walk | Impossible to walk |

<Evaluation of Test Results>

The outsoles of Examples 1 to 4 can exhibit superior mechanical properties and wear resistance, in particular, remarkably improved non-slip properties to the extent that a user who is wearing shoes having the above outsole is able to walk not only in the wet state but also on the inclined ice.

The outsole of Comparative Example 1, which does not include glass fibers, can be seen to have poor mechanical properties and wear resistance, in particular, inferior non-slip properties.

The mechanical properties, wear resistance and non-slip properties of the outsole of Comparative Example 2, which includes glass fibers but for which cutting and arrangement for locating one-side ends of the glass fibers on the lower surface of the outsole are not performed, are superior compared to those of Comparative Example 1 without the use of glass fibers, but are inferior compared to those of Examples 1 to 4 in which one-side ends of glass fibers are located at the lower surface of the outsole.

Therefore, when the glass fibers are used and the cutting and arrangement are carried out so that one-side ends of the glass fibers are located at the lower surface of the outsole, the resulting outsole can exhibit superior mechanical properties and wear resistance, in particular, remarkably improved non-slip properties to the extent that a user who is wearing shoes having such an outsole is able to walk even on the inclined ice.

As described above, one embodiment of the present invention provides a slip-resistant rubber composition, an outsole using the rubber composition and a method of manufacturing the outsole. According to one embodiment of the present invention, the slip-resistant rubber composition includes glass fibers and various types of additives for uniformly dispersing the glass fibers, thus remarkably improving wear resistance and non-slip properties without changing the basic properties of rubber.

Also, according to one embodiment of the present invention, the outsole using the slip-resistant rubber composition, in which one-side ends of glass fibers are located at the lower surface of the outsole, exhibits remarkably improved wear resistance and non-slip properties so that a user who is wearing shoes having such an outsole is able to walk even on inclined ice.

Also, according to one embodiment of the present invention, the method of manufacturing the outsole using the slip-resistant rubber composition includes cutting and arrangement so that many one-side ends of glass fibers are located at the lower surface of the outsole, thus obtaining the outsole having remarkably improved wear resistance and non-slip properties.

Although some embodiments of the present invention have been disclosed for illustrative purposes, those skilled in the art will appreciate that various modifications, additions and substitutions are possible, without departing from the scope and spirit of the invention as disclosed in the accompanying claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A slip-resistant rubber composition, comprising: a substrate made of rubber, about 0.2 to about 7 parts by weight of a vulcanizer, about 1 to about 10 parts by weight of glass fibers, and about 1 to about 200 parts by weight of an additive, based on 100 parts by weight of the substrate,
   wherein the additive comprises about 15 to about 25 parts by weight of a filler, about 4 to about 6 parts by weight of a softener, about 6 to about 10 parts by weight of a vulcanization accelerator, about 1 to about 2 parts by weight of an antioxidant, and about 0.5 to about 1 parts by weight of a wear inhibitor, based on 100 parts by weight of the substrate, and
   wherein the rubber comprises about 10 to about 20 wt % of natural rubber, about 40 to about 60 wt % of isoprene rubber, and about 25 to about 35 wt % of butadiene rubber, the filler comprises carbon black, the softener comprises about 70 to about 90 wt % of process oil and about 10 to about 30 wt % of stearic acid, the vulcanization accelerator comprises about 40 to about 60 wt % of zinc oxide, about 20 to about 30 wt % of polyethyleneglycol, about 4 to about 6 wt % of mercaptobenzothiazole, about 9 about 14 wt % of tetramethylthiuram monosulfide, and about 0.45 to about 0.7 wt % of dibenzothiazole disulfide, the antioxidant comprises dibutylhydroxytoluene, and the wear inhibitor comprises β-(3,4-epoxycyclohexyl) ethyltrimethoxysilane.

2. The slip-resistant rubber composition as set forth in claim 1, wherein the vulcanizer comprises one or a mixture of two or more selected from the group consisting of sulfur, selenium, tellurium and an organic sulfur compound, the filler comprises one or a mixture of two or more selected from the group consisting of carbon black, white carbon, calcium carbonate, magnesium carbonate and talc, and the softener comprises one or a mixture of two or more selected from the group consisting of process oil, pine oil, glycerin, stearic acid, and dioctylphthalate.

3. The slip-resistant rubber composition as set forth in claim 2, wherein the vulcanization accelerator comprises one or a mixture of two or more selected from the group consisting of zinc oxide, magnesium oxide, polyethyleneglycol, mercaptobenzothiazole, tetramethylthiuram monosulfide and dibenzothiazole disulfide, the antioxidant comprises one or a mixture of two or more selected from the group consisting of hydroquinone, dibutylhydroxytoluene and butylhydroxyanisole, and the wear inhibitor comprises one or a mixture of two or more selected from the group consisting of β-(3,4-epoxycyclohexyl)ethyltrimethoxysilane, γ-glycidoxypropyltrimethoxysilane and γ-mercaptopropyltrimethoxysilane.

4. A slip-resistant rubber composition, comprising: a substrate made of rubber, about 0.5 to about 3 parts by weight of a vulcanizer, about 2 to about 5 parts by weight of glass fibers, and about 1 to about 100 parts by weight of an additive, based on 100 parts by weight of the substrate,
   wherein the additive comprises about 15 to about 25 parts by weight of a filler, about 4 to about 6 parts by weight of a softener, about 6 to about 10 parts by weight of a vulcanization accelerator, about 1 to about 2 parts by weight of an antioxidant, and about 0.5 to about 1 parts by weight of a wear inhibitor, based on 100 parts by weight of the substrate, and
   wherein the rubber comprises about 10 to about 20 wt % of natural rubber, about 40 to about 60 wt % of isoprene rubber, and about 25 to about 35 wt % of butadiene rubber, the filler comprises carbon black, the softener comprises about 70 to about 90 wt % of process oil and about 10 to about 30 wt % of stearic acid, the vulcanization accelerator comprises about 40 to about 60 wt % of zinc oxide, about 20 to about 30 wt % of polyethyleneglycol, about 4 to about 6 wt % of mercaptobenzothiazole, about 9 about 14 wt % of tetramethylthiuram monosulfide, and about 0.45 to about 0.7 wt % of dibenzothiazole disulfide, the antioxidant comprises dibutylhydroxytoluene, and the wear inhibitor comprises β-(3,4-epoxycyclohexyl)ethyltrimethoxysilane.

5. The slip-resistant rubber composition as set forth in claim 4, wherein the vulcanizer comprises one or a mixture of two or more selected from the group consisting of sulfur, selenium, tellurium and an organic sulfur compound, the filler comprises one or a mixture of two or more selected from the group consisting of carbon black, white carbon, calcium carbonate, magnesium carbonate and talc, and the softener comprises one or a mixture of two or more selected from the group consisting of process oil, pine oil, glycerin, stearic acid, and dioctylphthalate.

6. The slip-resistant rubber composition as set forth in claim 5, wherein the vulcanization accelerator comprises one or a mixture of two or more selected from the group consisting of zinc oxide, magnesium oxide, polyethyleneglycol, mercaptobenzothiazole, tetramethylthiuram monosulfide and dibenzothiazole disulfide, the antioxidant comprises one or a mixture of two or more selected from the group consisting of hydroquinone, dibutylhydroxytoluene and butylhydroxyanisole, and the wear inhibitor comprises one or a mixture of two or more selected from the group consisting of β-(3,4-epoxycyclohexyl) ethyltrimethoxysilane, γ-glycidoxypropyltrimethoxysilane and γ-mercaptopropyltrimethoxysilane.

* * * * *